(12) United States Patent
Park

(10) Patent No.: US 9,027,696 B2
(45) Date of Patent: May 12, 2015

(54) EXTERNAL AIRBAG APPARATUS FOR VEHICLE

(71) Applicant: HYUNDAI MOBIS Co., Ltd., Yongin-si, Gyeonggi-do (KR)

(72) Inventor: Hae Kwon Park, Yongin-si (KR)

(73) Assignee: HYUNDAI MOBIS Co., Ltd., Yongin-si, Gyeonggi-do (KR)

(*) Notice: Subject to any disclaimer, the term of this patent is extended or adjusted under 35 U.S.C. 154(b) by 0 days.

(21) Appl. No.: 14/146,050

(22) Filed: Jan. 2, 2014

(65) Prior Publication Data

US 2015/0008064 A1    Jan. 8, 2015

(30) Foreign Application Priority Data

Jul. 3, 2013    (KR) .................. 10-2013-0077968

(51) Int. Cl.
*B60R 21/36* (2011.01)
*B60R 21/34* (2011.01)
*B60R 21/233* (2006.01)

(52) U.S. Cl.
CPC ............. *B60R 21/36* (2013.01); *B60R 21/34* (2013.01); *B60R 21/233* (2013.01); *B60R 2021/23324* (2013.01)

(58) Field of Classification Search
USPC ................. 180/274, 271; 280/743.1, 743.2
IPC .......................................... B60R 21/34,21/36
See application file for complete search history.

(56) References Cited

U.S. PATENT DOCUMENTS

| | | | |
|---|---|---|---|
| 6,883,631 B2* | 4/2005 | Hu et al. | 180/274 |
| 6,923,483 B2* | 8/2005 | Curry et al. | 293/107 |
| 7,036,844 B2* | 5/2006 | Hammer et al. | 280/730.1 |
| 7,882,921 B2* | 2/2011 | Hakki et al. | 180/271 |
| 8,764,062 B2* | 7/2014 | Chung et al. | 280/770 |

FOREIGN PATENT DOCUMENTS

| | | |
|---|---|---|
| JP | H07-329695 | 12/1995 |
| JP | 2000-052913 | 2/2000 |
| JP | 2006-123679 | 5/2006 |
| KR | 10-2012-0122744 | 11/2012 |

* cited by examiner

*Primary Examiner* — Faye M Fleming
(74) *Attorney, Agent, or Firm* — Sherr & Jiang, PLLC

(57) ABSTRACT

The present invention relates to an external airbag apparatus for a vehicle, including: an inflator; an airbag cushion which is deployed by gas flowing into the airbag cushion from the inflator; a separator which is disposed in the airbag cushion so as to separate an internal space of the airbag cushion into a plurality of chambers; and a vent hole which is formed in the airbag cushion so as to discharge gas flowing into the chamber to the outside.

17 Claims, 7 Drawing Sheets

EXTERNAL AIRBAG APPARATUS FOR VEHICLE

CROSS-REFERENCE TO RELATED APPLICATIONS

The present application claims priority to Korean Patent Application Number 10-2013-0077968 filed Jul. 3, 2013, the entire contents of which the application is incorporated herein for all purposes by this reference.

TECHNICAL FIELD

The present invention relates to an external airbag apparatus for a vehicle, and more particularly, to an external airbag apparatus for a vehicle which is deployed toward a front side of a vehicle when a front portion of the vehicle collides with a collision body.

BACKGROUND

In general, an airbag apparatus is an apparatus that protects a passenger from impact at the time of a vehicle collision. When a collision is detected by a sensor, gas is quickly supplied to an airbag cushion by an inflator such that the airbag cushion is instantaneously deployed, thereby protecting the passenger in the vehicle.

An external airbag apparatus among the airbag apparatuses is an airbag apparatus which is mounted between a vehicle body and a bumper, and has an airbag cushion that is deployed toward a front side of the vehicle so as to absorb and mitigate impact force when the vehicle collides with a pedestrian or the like, thereby protecting the pedestrian.

However, the airbag cushion of the external airbag apparatus has a single chamber, and at the time of a local collision, gas flowing into the airbag cushion is moved toward a region that is not in direct contact with a collision body, and as a result, the airbag cushion is deployed in an abnormal shape as illustrated in FIG. 1. Therefore, there was a problem in that impact energy, which is applied to the pedestrian or the like, may not be reduced.

SUMMARY

The present invention has been made in an effort to provide an external airbag apparatus for a vehicle capable of improving a shock absorbing effect when a front portion of a vehicle collides with a collision object.

Technical problems of the present invention are not limited to the aforementioned technical problems, and other technical problems, which are not mentioned above, may be clearly understood by those skilled in the art from the following descriptions.

An exemplary embodiment of the present invention provides an external airbag apparatus for a vehicle, including: an inflator; an airbag cushion which is deployed by gas flowing into the airbag cushion from the inflator; a separator which is disposed in the airbag cushion so as to separate an internal space of the airbag cushion into a plurality of chambers; and a vent hole which is formed in the airbag cushion so as to discharge gas flowing into the chamber to the outside.

The plurality of chambers may be formed by the single separator disposed in the airbag cushion, and the separator may be disposed in the airbag cushion in the form of a zigzag.

The vent hole may be formed in each of the plurality of chambers, and the vent hole formed in one chamber and the vent hole formed in another chamber may be positioned at points that have different x, y, and z coordinates.

In addition, the vent hole formed in one chamber and the vent hole formed in the chamber adjacent to the one chamber may be positioned at points that have different x, y, and z coordinates.

The plurality of chambers may have a plurality of vent holes, respectively, and the plurality of vent holes formed in one chamber may be positioned at points that have different x, y, and z coordinates.

The airbag cushion may include: a left panel disposed at a left side of the airbag cushion; a right panel disposed at a right side of the airbag cushion so as to face the left panel; an upper panel disposed at an upper side of the airbag cushion; a lower panel disposed at a lower side of the airbag cushion so as to face the upper panel; and a front panel disposed at a front side of the airbag cushion, in which the plurality of vent holes is formed in at least one of the left panel, the right panel, the upper panel, and the lower panel.

The plurality of chambers may include a left chamber disposed at the left side of the airbag cushion, a right chamber disposed at the right side of the airbag cushion, and at least one intermediate chamber positioned between the left and right chambers, the vent hole of the left chamber may be formed in the left panel, the vent hole of the right chamber may be formed in the right panel, and the vent hole of the intermediate chamber may be formed in at least one of the upper panel and the lower panel.

The plurality of vent holes may be formed to have different sizes and/or shapes.

In addition, a plurality of separators is arranged in a straight line pattern or in a radial pattern.

The plurality of chambers may be formed to have different shapes or volumes.

According to the external airbag apparatus for a vehicle of the present invention, there are one or more effects as follows.

Firstly, internal pressure in an airbag cushion may be adjusted based on a deployment speed of the airbag cushion, and a structure of efficiently absorbing impact energy may be implemented, thereby improving performance of the airbag apparatus.

Secondly, internal pressure in the airbag cushion may be controlled using a structure of the airbag cushion without providing a separate internal pressure adjusting device in the airbag cushion such that convenience is improved, and there is no need for a separate tether or other devices, thereby reducing the number of components.

The effects of the present invention are not limited to the aforementioned effects, and other effects, which are not mentioned above, will be clearly understood by those skilled in the art from the claims.

DETAILED DESCRIPTION

Figure 1:
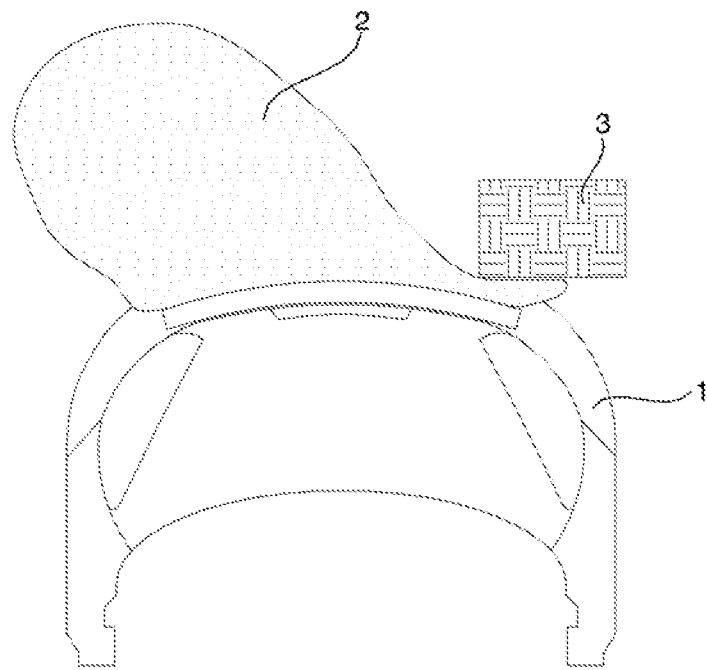
FIG. 1 is a view illustrating an external airbag apparatus for a vehicle according to the related art at the time of a vehicle collision.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, the present invention will be described with reference to the drawings for explaining an external airbag apparatus for a vehicle according to exemplary embodiments of the present invention.

Figure 2A:
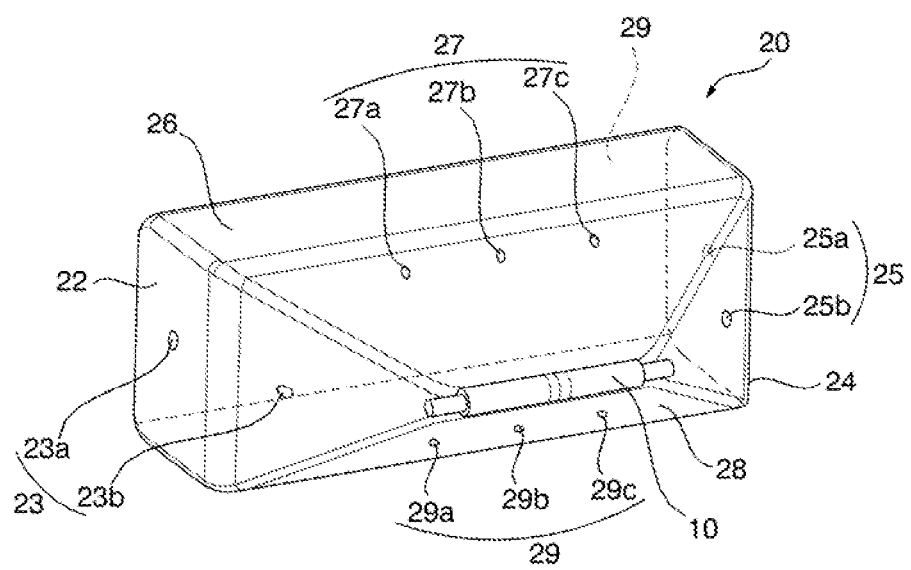
FIG. 2A is a perspective view illustrating a state in which an external airbag apparatus for a vehicle according to an exemplary embodiment of the present invention is deployed.
Figure 2B:
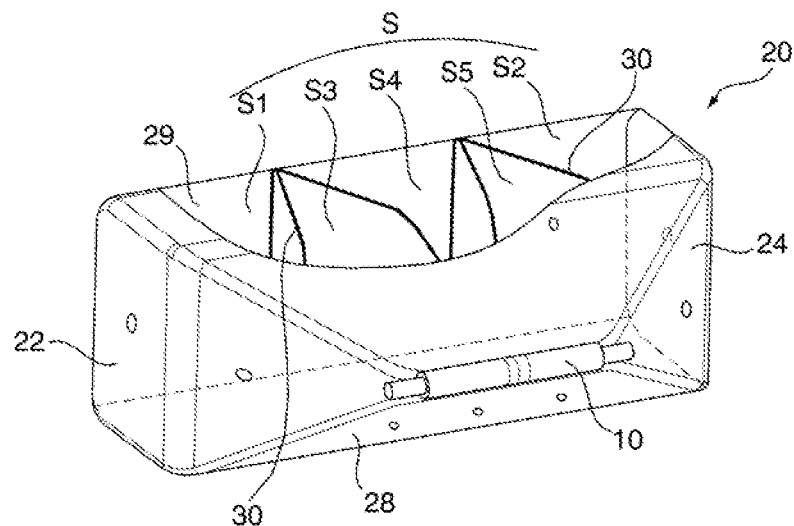
FIG. 2B is a view illustrating a state in which a part of an upper panel of the external airbag apparatus for a vehicle illustrated in FIG. 2A is cut out.
Figure 2C:
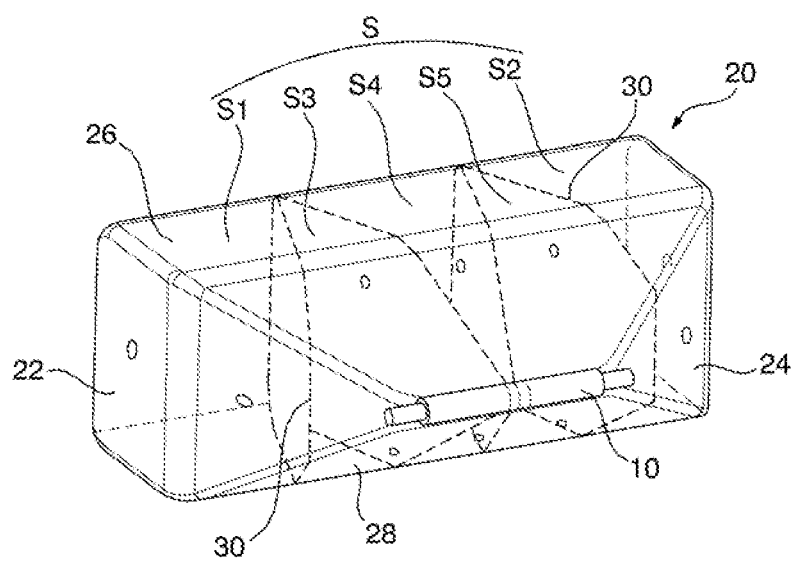
FIG. 2C is a view illustrating the interior of the external airbag apparatus for a vehicle illustrated in FIG. 2A.

Referring to FIGS. 2A to 2C, an external airbag apparatus for a vehicle according to an exemplary embodiment of the present invention includes an airbag cushion 20 which is deployed by gas flowing into the airbag cushion 20 from an inflator 10, a separator 30 which is disposed in the airbag cushion 20 so as to separate an internal space of the airbag cushion 20 into a plurality of chambers S, and a plurality of vent parts 23, 25, 27, and 29 which is formed in the airbag cushion 20 so as to discharge gas flowing into the plurality of chambers S.

When a front portion of the vehicle collides with a collision body, the airbag cushion 20 is deployed forward by gas generated by the inflator 10 provided in an airbag housing (not illustrated) that is mounted at a bumper side of the vehicle. The airbag cushion 20 may be made of a soft fabric material because the airbag cushion 20 comes into contact with a pedestrian.

At the time of a vehicle collision, an airbag control unit (not illustrated) controls the inflator 10 to discharge gas such that the airbag cushion 20 is deployed. The internal space of the airbag cushion 20 has the plurality of chambers S that is separated by the separator 30, and the interior of each of the plurality of chambers S is filled with gas generated by the inflator 10. The plurality of vent parts 23, 25, 27, and 29 is formed in the airbag cushion 20 so as to discharge gas flowing into the plurality of chambers S.

In the present exemplary embodiment, the internal space of the airbag cushion 20 is separated into five independent chambers S by the separator 30, and gas generated by the inflator 10 flows into each of the five independent chambers S.

The airbag cushion 20 includes a left panel 22 disposed at the left side, a right panel 24 disposed at the right side so as to face the left panel, an upper panel 26 disposed at the upper side, a lower panel 28 disposed at the lower side so as to face the upper panel 26, and a front panel 29 disposed at the front side. The left panel 22, the right panel 24, the upper panel 26, the lower panel 28, and the front panel 29 are coupled by sewing so as to form an external appearance of the airbag cushion 20.

In the airbag cushion 20, the vent parts 23, 25, 27, and 29 are formed in the left panel 22, the right panel 24, the upper panel 26, and the lower panel 28 so as to discharge gas flowing into each of the chambers S. However, a vent part is not formed in the front panel 29 that comes into contact with the pedestrian or the like when the airbag cushion 20 is deployed, thereby preventing the pedestrian from being injured by high-temperature and high-pressure gas.

In the present exemplary embodiment, the single separator 30 is arranged in the airbag cushion 20 in the form of a zigzag so that the plurality of chambers S is irregularly disposed. A plurality of separators 30 may be arranged in the airbag cushion 20 independent of each other.

The separator 30 separates the internal space of the airbag cushion 20 into the plurality of chambers S that has different volumes. In the present exemplary embodiment, the chambers S include a first chamber S1 formed at the left side, a second chamber S2 formed at the right side so as to face the first chamber S1, and third, fourth, and fifth chambers S3, S4, and S5 positioned between the first and second chambers S1 and S2. In the present exemplary embodiment, the first and second chambers S1 and S2 are formed to have volumes greater than those of the third, fourth, and fifth chambers S3, S4, and S5 disposed at the middle between the first and second chambers S1 and S2. Meanwhile, the chambers may be separated to have the same volume. The separator 30 may be made of a pressure-resistant and heat-resistant material because the separator 30 comes into contact with high-temperature and high-pressure gas generated by the inflator 10, and may be made of a fabric material so as to reduce a weight.

The plurality of vent parts 23, 25, 27, and 29 includes a first vent part 23 formed in a region of the left panel 22 that corresponds to the first chamber S1, a second vent part 25 formed in a region of the right panel 24 that corresponds to the second chamber S2, a third vent part 27 formed in a region of the upper panel 26 that corresponds to each of the third, fourth, fifth chambers S3, S4, and S5, and a fourth vent part 29 formed in a region of the lower panel 28 that corresponds to each of the third, fourth, fifth chambers S3, S4, and S5.

The vent parts each includes a plurality of vent holes. For example, the first vent part 23 includes two vent holes 23a and 23b.

Each of the vent holes may be formed to have a different size and/or shape. The vent hole may be formed in a rectangular shape, a hexagonal shape, a triangular shape, a quadrangular shape, a circular shape, or the like, and in the present exemplary embodiment, the vent hole is formed in a circular shape. Like a typical vent hole, the vent hole is opened when gas pressure in the chamber is increased to a predetermined amount or more such that gas in the chamber may be discharged to the outside.

Figure 3A:
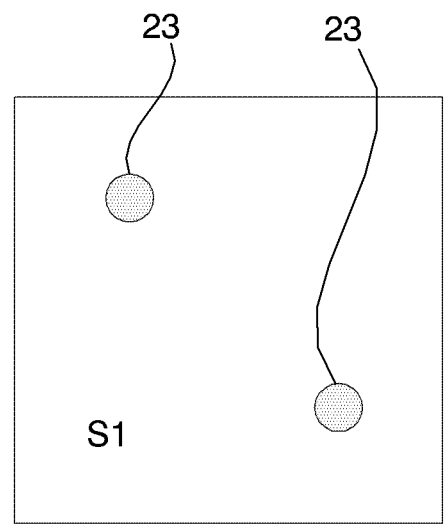
FIG. 3A is a view illustrating a left panel and vent holes of the external airbag apparatus for a vehicle according to the exemplary embodiment of the present invention.
Figure 3B:
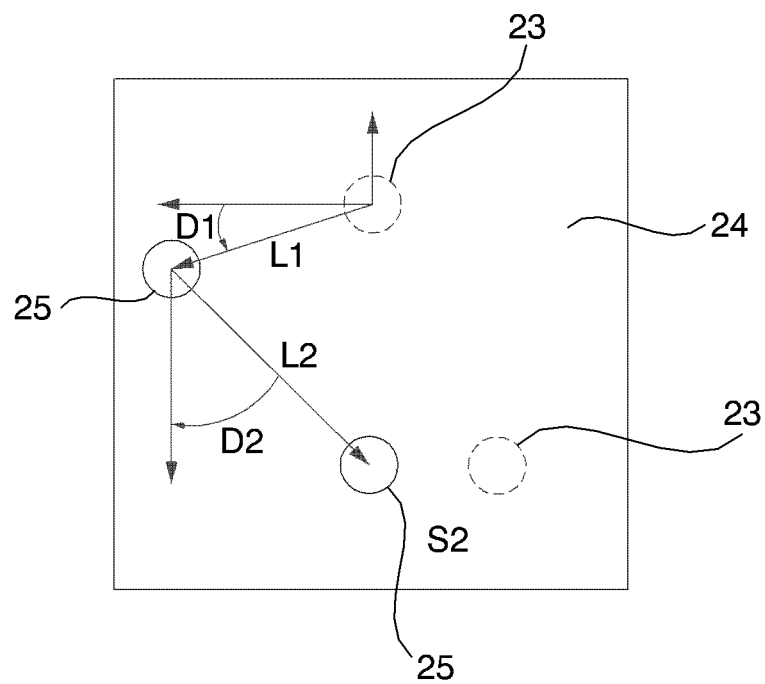
FIG. 3B is a view illustrating a right panel and vent holes.

FIG. 3A is a view illustrating a state in which the first and second vent holes 23a and 23b of the first vent part 23 are formed in the left panel 22, and FIG. 3B is a view illustrating a state in which first and second vent holes 25a and 25b of the second vent part 25 are formed in the right panel 24.

The first vent part 23 discharges gas flowing into the first chamber S1 to the outside, and the second vent part 25 discharges gas flowing into the second chamber S2 to the outside.

The first vent hole 23a and the second vent hole 23b of the first vent part 23 are arranged in a diagonal direction. Therefore, the first and second vent holes 23a and 23b are positioned at points that have different x, y, and z coordinates. The first and second vent holes 25a and 25b of the second vent part 25 are arranged in a diagonal direction that is different in gradient from the direction in which the first and second vent holes 23a and 23b of the first vent part 23 are arranged. Therefore, the first and second vent holes 23a and 23b of the first vent part 23 are arranged so as not to overlap the first and second vent holes 25a and 25b of the second vent part 25 when the left panel 22 is projected onto the right panel 24. Therefore, the first and second vent holes 23a and 23b of the first vent part and the first and second vent holes 25a and 25b of the second vent part are also positioned at points that have different x, y, and z coordinates.

In more detail, when the left panel 22 is projected onto the right panel 24, the first vent hole 25a of the second vent part is formed to be spaced apart from a center of the first vent hole 23a of the first vent part by a first angle D1 and a first distance L1, and the second vent hole 25b of the second vent part is formed to be spaced apart from a center of the first vent hole 25a of the second vent part by a second angle D2 and a second distance L2. The aforementioned second angle D2 is greater than the first angle D1, and the second distance L2 is greater than the first distance L1.

Figure 3C:
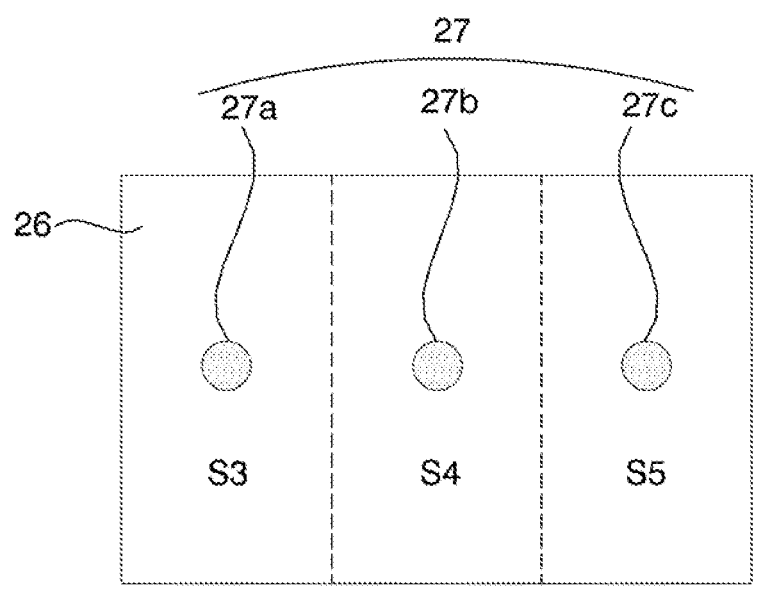
FIG. 3C is a view illustrating an upper panel and vent holes.
Figure 3D:
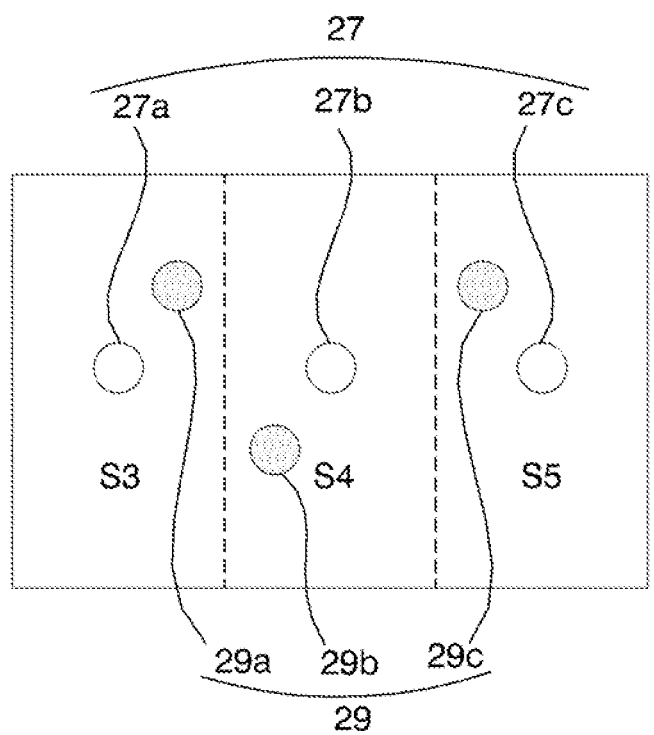
FIG. 3D is a view illustrating a lower panel and vent holes.

FIG. 3C is a view illustrating a state in which the third vent part 27 is formed in the upper panel 26, and FIG. 3D is a view illustrating a state in which the fourth vent part 29 is formed in the lower panel 28.

The third vent part 27 may include a first vent hole 27a of the third chamber S3, a first vent hole 27b of the fourth chamber S4, and a first vent hole 27c of the fifth chamber S5, which are formed in regions of the upper panel 26 that correspond to the third, fourth, and fifth chambers S3, S4, and S5, thereby discharging gas in the third, fourth, and fifth chambers S3, S4, and S5 to the upper side.

The fourth vent part 29 may include a second vent hole 29a of the third chamber S3, a second vent hole 29b of the fourth chamber S4, and a second vent hole 29c of the fifth chamber S5, which are formed in regions of the lower panel 28 that correspond to the third, fourth, and fifth chambers S3, S4, and S5, thereby discharging gas in the third, fourth, and fifth chambers S3, S4, and S5 to the lower side.

Referring to FIGS. 3C and 3D, the first vent hole 27a of the third chamber S3, the first vent hole 27b of the fourth chamber S4, and the first vent hole 27c of the fifth chamber S5, which are formed in the upper panel 26, may be positioned on the same horizontal line. The second vent hole 29a of the third chamber S3, the second vent hole 29b of the fourth chamber S4, and the second vent hole 29c of the fifth chamber S5, which are formed in the lower panel 28, are arranged in a "V" shape. Therefore, the plurality of vent holes 27a, 27b, and 27c of the third vent part 27 is arranged so as not to overlap the plurality of vent holes 29a, 29b, and 29c of the fourth vent part 29 when the plurality of vent holes 27a, 27b, and 27c of the third vent part 27 are projected onto the lower panel 28. Meanwhile, the plurality of vent holes 27a, 27b, and 27c of the third vent part 27 may be arranged so as not to be positioned on the same horizontal line. In this case, the vent holes formed in the third, fourth, fifth chambers are positioned at points that have different x, y, and z coordinates.

Therefore, the plurality of vent holes, which is formed in the first vent part 23, the second vent part 25, the third vent part 27, and the fourth vent part 29, is arranged at points that have different coordinates, such that a non-uniform flow of gas flowing into each of the plurality of chambers S may be induced when the front portion of the vehicle collides with a collision object.

Figure 4:
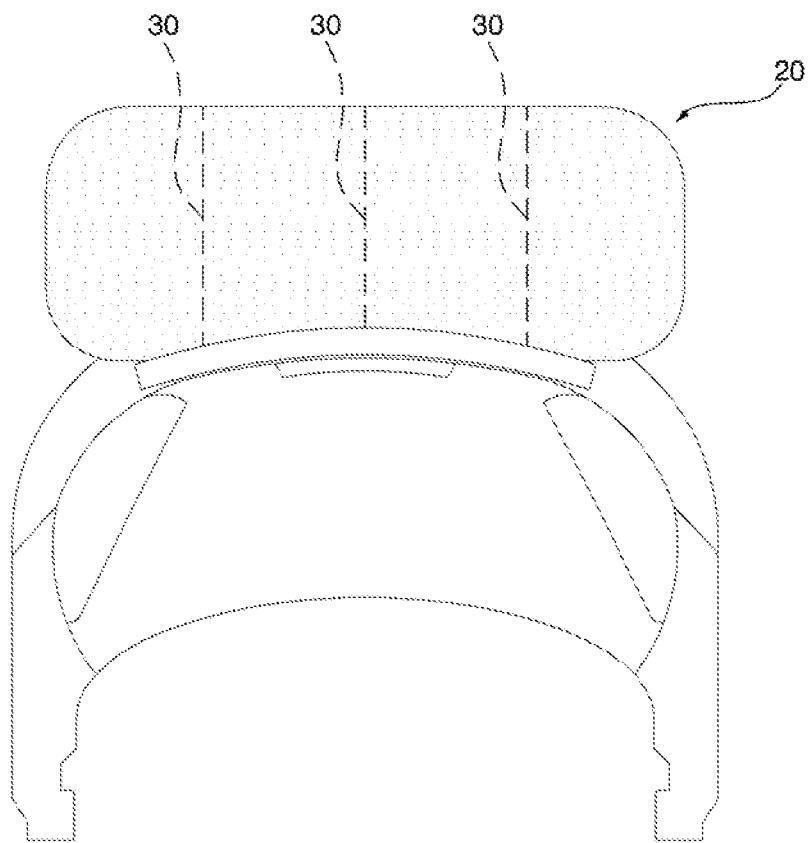
FIG. 4 is a view illustrating a state in which an airbag apparatus for a vehicle according to another exemplary embodiment of the present invention is deployed.

FIG. 4 is a view illustrating a state in which an airbag apparatus for a vehicle according to another exemplary embodiment of the present invention is deployed, and the interior of the airbag apparatus.

Referring to FIG. 4, a plurality of separators 30 is vertically arranged so as to be spaced apart from each other, such that a plurality of chambers is formed. The separators 30 may be arranged in a radial pattern.

An operation of the external airbag apparatus for a vehicle according to the present invention, which is configured as described above, will be described below.

When the front portion of the vehicle collides with a collision body, the airbag control unit (ACU) operates the external airbag apparatus that is disposed at the front side of the vehicle. First, the airbag control unit (not illustrated) operates the inflator 10 so as to generate high-pressure gas, and the high-pressure gas generated by the inflator 10 flows into each of the chambers S1 to S5 of the airbag cushion 20 through a gas inlet of the airbag cushion 20.

The gas flows into the plurality of chambers S, which is separated from each other, such that each of the chambers independently absorbs impact force at the time of various local collisions.

Assuming that a collision body collides with the first chamber S1 at the front side of the airbag cushion 20 according to the present invention, the first chamber S1 is pressed by the collision body so that internal pressure in the first chamber S1 is increased compared to those in the other chambers, and therefore the first chamber S1 absorbs impact while high-pressure gas flows to the outside through the first and second vent holes 23a and 23b of the first chamber during a deployment process, and the second to fifth chambers S2 to S5 discharge gas to the outside through the vent holes formed in each of the chambers when the airbag apparatus is fully deployed. In addition, the plurality of vent holes of the first to fourth vent parts 23, 25, 27, and 29 formed in the airbag cushion 20 is formed to have different arrangements and different shapes or sizes, thereby irregularly discharging gas to the outside.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An external airbag apparatus for a vehicle, comprising:
   an inflator;
   an airbag cushion which is deployed by gas flowing into the airbag cushion from the inflator;
   a separator which is disposed in the airbag cushion so as to separate an internal space of the airbag cushion into a plurality of chambers; and
   a vent hole which is formed in the airbag cushion so as to discharge gas flowing into the chamber to the outside,
   wherein the separator includes a sheet of thin material having edges attached to an inner surface of the airbag.

2. The external airbag apparatus of claim 1, wherein the vent hole is formed in each of the plurality of chambers.

3. The external airbag apparatus of claim 2, wherein the vent hole formed in one chamber and the vent hole formed in another chamber are positioned at points that have different x, y, and z coordinates.

4. The external airbag apparatus of claim 2, wherein the vent hole formed in one chamber and the vent hole formed in the chamber adjacent to the one chamber are positioned at points that have different x, y, and z coordinates.

5. The external airbag apparatus of claim 2, wherein the plurality of chambers has a plurality of vent holes, respectively, and the plurality of vent holes formed in one chamber is positioned at points that have different x, y, and z coordinates.

6. The external airbag apparatus of claim 2, wherein the plurality of vent holes has different sizes and/or shapes.

7. The external airbag apparatus of claim 1, wherein the separators are arranged in a straight line pattern or in a radial pattern.

8. The external airbag apparatus of claim 1, wherein the plurality of chambers is formed to have different shapes and/or volumes.

9. The external airbag apparatus of claim 1, wherein the separator is made of a pressure-resistant and heat-resistant material.

10. An external airbag apparatus for a vehicle, comprising:
an inflator;
an airbag cushion which is deployed by gas flowing into the airbag cushion from the inflator;
a separator which is disposed in the airbag cushion so as to separate an internal space of the airbag cushion into a plurality of chambers; and
a vent hole which is formed in the airbag cushion so as to discharge gas flowing into the chamber to the outside,
wherein the plurality of chambers are formed by the single separator disposed in the airbag cushion.

11. The external airbag apparatus of claim 10, wherein the separator is disposed in the airbag cushion in the form of a zigzag.

12. An external airbag apparatus for a vehicle, comprising:
an inflator;
an airbag cushion which is deployed by gas flowing into the airbag cushion from the inflator;
a separator which is disposed in the airbag cushion so as to separate an internal space of the airbag cushion into a plurality of chambers; and
a vent hole which is formed in the airbag cushion so as to discharge gas flowing into the chamber to the outside,
wherein the vent hole is formed in each of the plurality of chambers,
wherein the airbag cushion includes:
a left panel disposed at a left side of the airbag cushion;
a right panel disposed at a right side of the airbag cushion so as to face the left panel;
an upper panel disposed at an upper side of the airbag cushion;
a lower panel disposed at a lower side of the airbag cushion so as to face the upper panel; and
a front panel disposed at a front side of the airbag cushion,
wherein the plurality of vent holes is formed in at least one of the left panel, the right panel, the upper panel, and the lower panel.

13. The external airbag apparatus of claim 12, wherein the plurality of chambers includes a left chamber disposed at the left side of the airbag cushion, a right chamber disposed at the right side of the airbag cushion, and at least one intermediate chamber positioned between the left and right chambers, the vent hole of the left chamber is formed in the left panel, the vent hole of the right chamber is formed in the right panel, and the vent hole of the intermediate chamber is formed in at least one of the upper panel and the lower panel.

14. The external airbag apparatus of claim 13, wherein the vent hole of the left chamber and the vent hole of the right panel are positioned at points that have different x, y, and z coordinates.

15. The external airbag apparatus of claim 14, wherein a plurality of vent holes is formed in the left chamber and the right chamber, respectively.

16. The external airbag apparatus of claim 13 wherein the vent hole of the intermediate chamber is formed in each of the upper panel and the lower panel.

17. The external airbag apparatus of claim 13, wherein the vent hole formed in the upper panel and the vent hole formed in the lower panel are positioned at points that have different x, y, and z coordinates.

* * * * *